United States Patent [19]

Pankonien

[11] 4,206,637
[45] Jun. 10, 1980

[54] MARINE SPEEDOMETER

[76] Inventor: Gary W. Pankonien, 16109 Seattle, Houston, Tex. 77040

[21] Appl. No.: 953,272

[22] Filed: Oct. 20, 1978

[51] Int. Cl.² .................... G01C 21/10; G01D 5/34
[52] U.S. Cl. .................................... 73/187; 324/175
[58] Field of Search ............... 73/187, 184, 185, 186; 324/175

[56] References Cited

U.S. PATENT DOCUMENTS

| Re. 28,839 | 6/1976 | Overs .................... 73/187 |
| 1,957,681 | 5/1934 | Thompson ............... 73/187 X |
| 3,175,152 | 3/1965 | Shafer .................... 73/187 |
| 3,175,396 | 3/1965 | Kock ..................... 73/187 |

*Primary Examiner*—Daniel M. Yasich

[57] ABSTRACT

A paddle wheel transducer for mounting to a marine vehicle utilizes a source of radiant energy for establishing a beam of radiant energy directed perpendicular to the direction of movement of the paddle wheel vanes and a radiant energy responsive element for detecting interruptions of the radiant energy beam produced by passage of the paddle wheel vanes therethrough to detect paddle wheel rotation. The radiant energy beam is a beam of infrared light and the radiant energy responsive means is a phototransistor.

In providing a marine speedometer utilizing the radiant energy paddle wheel transducer, the phototransistor is connected in an electrical circuit which produces an electrical pulse output signal representative of paddle wheel rotation. The pulse signal is applied to digital circuitry which is operable to count pulses under the control of auxiliary control logic and develop a count representative of marine vehicle speed. The marine vehicle speed is displayed on a digital readout.

6 Claims, 4 Drawing Figures

MARINE SPEEDOMETER

BACKGROUND OF THE INVENTION

The present invention relates to marine instrumentation of the type which provides information regarding the movement of a marine vehicle through the water. More particularly, the present invention relates to an improved marine vehicle movement transducer and a marine speedometer utilizing the same.

Heretofore, the movement of a marine vehicle, particularly its velocity, has been ascertained by a variety of techniques. Motor powered marine vehicles, sometimes referred to as "speedboats", have typically utilized a pressure sensing tube interconnected with a pressure gauge calibrated to provide a readout of a marine vehicle velocity. The transfer function of this type of marine speedometer is a square root function. Accordingly, the apparatus is very inaccurate at low speed (i.e., 0–15 m.p.h. on a 50 m.p.h. range scale). Furthermore, this type of speedometer is undesirable in that the pressure sensing tube is easily clogged with foreign matter and is subject to damage from water force.

Another technique known in the prior art for detecting the movement of a marine vehicle, to provide for a determination of both velocity and distance logged, utilizes a paddle wheel transducer having a plurality of vanes. One of the vanes of the paddle wheel carries a magnet. The transducer further includes a reed switch which opens and closes in response to movement of the magnet in close proximity thereto. An electronic current averaging circuit connected to the reed switch generates an electrical signal which is proportional to the velocity of the boat. The signal is applied to a suitable electrical meter calibrated to provide a readout of marine vehicle velocity. Due to the limited response capability of magnetically actuated reed switches, marine speedometers utilizing paddle wheel transducers have been restricted to use on sailboats and other low velocity (e.g., up to 15 knots) water vehicles.

As an alternative to a magnetically actuated reed switch sensor, other paddle wheel type transducers have utilized an electrical pickup coil to sense the passage of magnet mounted in the paddle wheel vanes. Rotation of the paddle wheel results in the development of an electrical voltage in the coil which is applied to a meter calibrated to indicate the speed of the boat. Again, however, due to the limited response capability of the coil sensor, such transducers can be effectively utilized only on low velocity water vehicles.

It is a further disadvantage of magnetic paddle wheel transducers that the additional mass of a magnet carried on a single paddle wheel vanes creates a rotational eccentricity which results in a friction loss on rotation of the paddle wheel about its mounting.

SUMMARY OF THE INVENTION

The present invention provides for the accurate measurement over an expanded speed range of the rate of movement of a marine vehicle through the water utilizing a paddle wheel transducer.

In accordance with the present invention, the rotation of a paddle wheel is sensed by detecting the passage of the vanes by a reference point defined by a beam of radiant energy directed perpendicular to the direction of movement of the vanes. Further in accordance with the invention, the detection can be with means responsive to an interruption of the radiant energy beam.

In a particular embodiment, the radiant energy beam may be established by a radiant energy source, such as light emitting diode, and the means responsive to beam interruption may be a light sensitive element. Moreover, the light sensitive element may be a photoconductive device which has a different electrical characteristic in the presence of light from that which it exhibits in the absence of light. Preferably, the light emitting diode emits infrared light and the photoconductive device is one which is sensitive to infrared light.

Yet further in accordance with the present invention, the radiant energy source is carried in a housing which mounts the paddle wheel. The source is disposed on the side of the paddle wheel opposite the radiant energy responsive element and in substantial alignment therewith such that the radiant energy beam produced by the source impinges upon the radiant energy responsive element.

In utilizing the radiant energy paddle wheel transducer of the present invention, movement of the paddle wheel produced by marine vehicle movement results in repeated interruption of the radiant energy beam. The rate of interruption of the beam is proportional to the velocity of the marine vehicle through the water. The interruptions of the radiant energy beam produce changes in the electrical characteristics of the radiant energy responsive element, which are translated into another physical stimulus, such as an electrical signal, which is measurable.

In accordance with another aspect of the present invention, a marine speedometer is provided which comprises in combination a radiant energy paddle wheel transducer as previously described and electronic circuitry responsive to changes in the radiant energy responsive element to provide a readout indication in units of velocity. The electronic circuitry preferably comprises means for developing an electrical output signal having a waveform which is representative of the changes in the radiant energy responsive element characteristics and digital circuitry for processing the output signal pulses and providing a digital readout. The digital circuitry may include a pulse counter, control logic and digital display means.

BRIEF DESCRIPTION OF THE DRAWINGS

A more complete appreciation of the invention may be had by reference to the accompanying drawings, illustrating a preferred embodiment of the invention to be described in detail, wherein:

FIG. 2a is a schematic diagram of preferred apparatus to be mounted on the printed circuit boards shown in FIG. 1;

FIG. 2b is a representation of the signal waveform output from the circuit of FIG. 2a.

DETAILED DESCRIPTION OF A PREFERRED EMBODIMENT

Figure 1:
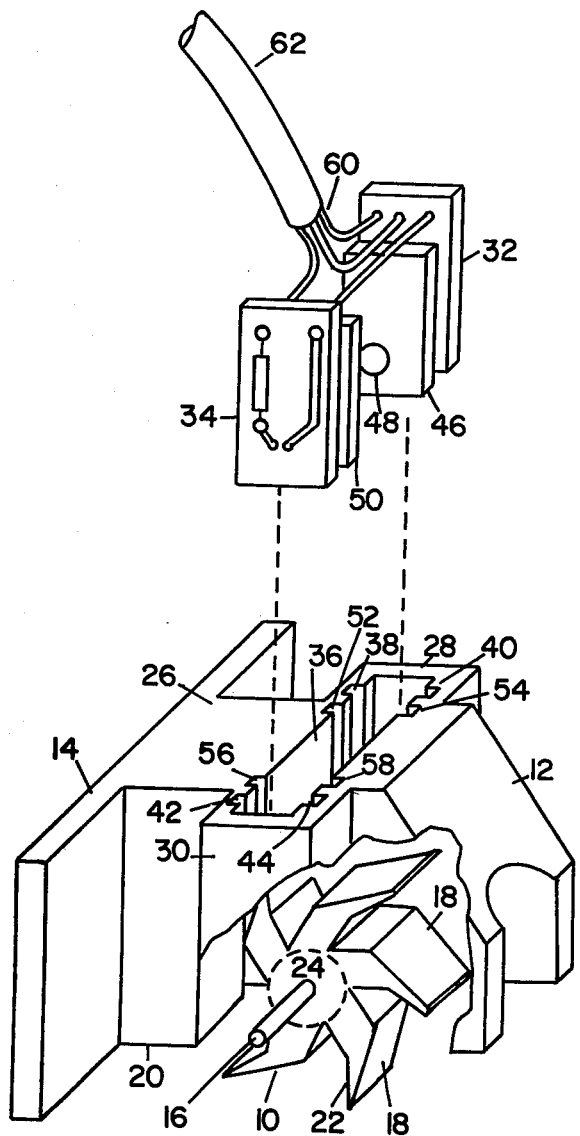
FIG. 1 is a cut-away pictorial view of a paddle wheel transducer including a housing adapted for mounting the rear of a marine vehicle and the printed circuit boards which carry the radiant energy source and the radiant energy responsive means.

Referring first to FIG. 1, a paddle wheel 10 is shown in a housing 12 which is adapted for mounting by means of a mounting adaptor 14 to a marine vehicle such as a powerboat. Paddle wheel 10 is rotatable within housing 12 about an axis of rotation defined by shaft 16, the ends of which are carried in journals (not shown) within housing 12. Paddle wheel 10 comprises a plurality of vanes 18, each of which is of a length sufficient for a portion to extend beneath the bottom surface 20 of housing 12. Furthermore, each paddle wheel vane is configured to provide a forward surface portion 22 disposed in a plane which extends tangentially with respect to hub portion 24. Additional aspects of the design of paddle wheel 10 will be pointed out, when relevant, during a discussion of other features of the illustrated embodiment of the invention.

With continued reference to FIG. 1, housing 12 has an interior cavity for receiving paddle wheel 10 in a vertical orientation, and with the axis of rotation of paddle wheel 10 extending parallel to mounting adaptor 14. It will be appreciated that mounting adaptor 14, shown as a flat plate, can be suitably attached to the stern of a marine vehicle, such as, for example, to the transom of a boat. And accordingly, by reason of the structural interconnection of housing 12 to mounting adaptor 14, by interconnecting portion 26, paddle wheel 10 will be disposed with its axis of rotation extending substantially parallel to the transom of the boat to which the apparatus is mounted. Furthermore, paddle wheel 10 will be disposed so as to be rotated upon movement of a boat to which the assembly is mounted in the aforementioned manner, by reason of a force acting on the forward portion 22 of each paddle wheel vane 18, and in this regard it is to be noted that housing 12 is to be mounted such that bottom surface 20 lies substantially co-planar with the lower edge of the transom.

As is also evident from the view of FIG. 1, housing 12 includes side walls 28 and 30. It is within the side walls of housing 12 that the ends of shaft 16 are journaled to provide paddle wheel 10 with rotational movement. In addition, side walls 28, 30 receive therein printed circuit boards 32 and 34, respectively. As shown in FIG. 1, an opening 36 extends through the top of housing 12 into the interior cavity of housing 12 in which paddle wheel 10 is disposed, and further extends laterally into each of the side walls 28, 30.

To provide for the disposition and retention of printed circuit boards 32 and 34 within their respective side walls 28 and 30, the fore and aft interior walls of opening 36 are provided with vertically extending grooves. For example, at the end of opening 36 which extends into side wall 28, vertical grooves 38 and 40 are formed. As will be readily appreciated, printed circuit board 32 comprises easily detachable means that may be readily disposed within housing 12 adjacent paddle wheel 10 by insertion thereof into grooves 38, 40. Similarly, the end of opening 36 which extends into side wall 30 is provided with vertical grooves 42 and 44 to permit disposition of printed circuit board 34 within housing 12 on the opposite side of paddle wheel 10. Again, positioning of printed circuit board 34 in housing 12 is by insertion of the circuit board into grooves 42, 44.

Adjacent to printed circuit board 32 is a guide member 46 having an aperture 48 formed therein. Correspondingly, a guide member 50 is to be provided adjacent printed circuit board 34. To accommodate guide members 46 and 50 within housing 12 additional grooves are formed on the fore and aft interior surfaces of opening 36. To accommodate guide member 46, grooves 52 and 54 are provided, and to accommodate guide member 50, grooves 56 and 58 are provided. The guide members and grooves provide guide means for alignment of the radiant energy source and the radiant energy responsive element to be described.

It will be readily appreciated that printed circuit boards 32 and 34, each of which carries electronic circuit components to be described herein, can be readily positioned within housing 12 on opposite sides of paddle wheel 10. Moreover, electrical interconnections extending to and between circuit boards 32, 34 can conveniently be accommodated within opening 36, and the sheathed portion 62 of the cable allowed to extend outwardly therefrom.

Figures 2A, 2B:
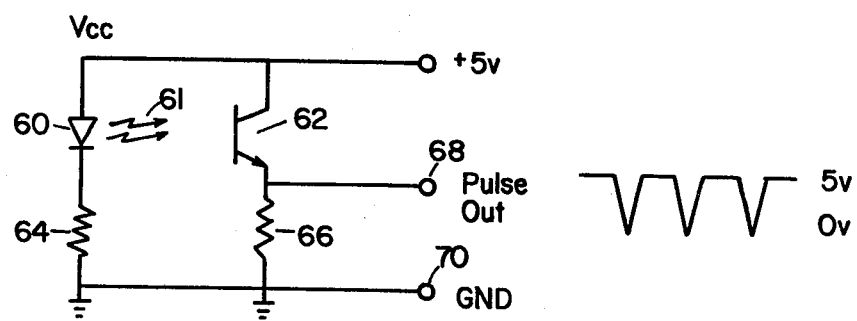

Referring next to FIG. 2a, there is presented a schematic diagram of the electronic circuitry which is contained on printed circuit boards 32 and 34 of FIG. 1. Generally speaking, the circuitry comprises a source of radiant energy and means responsive to radiant energy. In the embodiment shown in FIG. 2a, the source of radiant energy comprises a light emitting diode 60 and the radiant energy responsive means is a light sensitive element in the form of a photodetector 62. Preferably, light emitting diode 60 is an infrared emitting diode such as type SD 5455-4 PN gallium arsenide diode manufactured by Spectronics. Preferably, photodetector 62 is a type SD 5443-4 N-P-N silicon phototransistor manufactured by Spectronics.

In the circuit of FIG. 2a, a current limiting resistor 64 is provided in series with infrared emitting diode 60. In the circuit arrangement, the anode of infrared emitting diode 60 and the collector of phototransistor 62 are connected to a source of five volts D.C. power. The current limiting resistor 64 is connected to ground potential, thereby forward biasing diode 60. A resistor 66 is connected in series with phototransistor 62, between the emitter of phototransistor 62 and ground potential.

In the illustrative embodiment being described herein, light emitting diode 60 and series resistor 64 are contained on printed circuit board 34, the phototransistor 62 and resistor 66 are mounted on printed circuit board 32. Thus, the radiant energy source and the radiant energy responsive means are disposed on opposite sides of paddle wheel 10. Moreover, the radiant energy source and the radiant energy responsive means are placed in substantial alignment by guide means in the housing 12 whereby the radiant energy beam produced by the energy source will be directed to impinge upon the radiant energy responsive means. It will, of course, be understood that rotation of paddle wheel 10 will cause repeated interruption of the radiant energy beam by reason of the passage of vanes 18 therethrough.

In operation of the circuit of FIG. 2a, light emitting diode 60 produces a beam 61 of infrared light which is sensed by phototransistor 62. With this type of radiant energy impinging upon its base portion, phototransistor 62 is "turned-on." That is, phototransistor 62 will exhibit a low impedance characteristic and permit a flow of electrical current therethrough. Current flow through phototransistor 62 also establishes a flow of current through series resistor 66, which in turn produces a voltage drop across resistor 66. A decrease in the voltage drop across resistor 66 provides an indication of a change in the impedance characteristic of phototransistor 62, which in turn marks an interruption of the light beam by a paddle wheel vane. To further explain, in the event the beam of radiant energy directed between light emitting diode 60 and phototransistor 62 is interrupted, the impedance of phototransistor 62 increases to a very large value, reducing current flow therethrough to substantially zero. And accordingly, the voltage drop across resistor 66 drops to near zero volts. The voltage across resistor 66 can be measured between terminals 68 and 70. The waveform to be observed between terminals 68 and 70 when the radiant energy beam 61 is repeatedly interrupted is shown in FIG. 2b adjacent output terminal 68.

In the paddle wheel transducer apparatus comprising the structure shown in FIG. 1 and the circuitry shown in FIG. 2a, it will be understood that rotation of paddle wheel 10 will cause a repeated interruption of the radiant energy beam 61, which will in turn produce a waveform corresponding to that shown in FIG. 2b. It will, of course, be the case that the frequency of the pulse waveform will vary in accordance with, and in fact be directly proportional to, the speed at which paddle wheel 10 is rotated. The speed of rotation of paddle wheel 10 is, of course, a function of the rate of movement (i.e. velocity) of the marine vehicle to which the apparatus is mounted. Thus, with the radiant energy paddle wheel transducer illustrated herein, and which is in accordance with the present invention, an electrical pulse signal of a frequency proportional to the speed of a marine vehicle can be provided.

Radiant energy responsive means, such as phototransistor 62, have a response time on the order of 6-8 microseconds. That is, the switching time between "turn-on" and "turn-off" states is on the order of 6-8 microseconds. Therefore, phototransistor 62 can detect repeated interruptions of radiant energy beams 61 which are spaced as little as 14 microseconds apart.

With the paddle wheel shown in FIG. 1, which has six vanes, six interruptions of radiant energy beam 61 per revolution will occur. If the interruptions are spaced 15 microseconds apart (i.e. maximum pulse response capability of phototransistor 62), the total amount of time for a single revolution of paddle wheel 10 would be 90 microseconds. The distance the marine vehicle travels for each revolution of the paddle wheel is a function of the circumference of the paddle wheel. That is, linear distance travelled by the boat per revolution of paddle wheel 10 is equal to the circumference of the paddle wheel. Assuming that the diameter of the paddle wheel is two inches, the boat will travel approximately one-half foot per revolution of paddle wheel 10 (i.e. 3.14×0.125 ft.). Therefore, in order to approach the maximum response time of phototransistor 62, the boat would have to be moving 5,500 feet per second, which is 3,750 m.p.h. This is an absurdity, of course, but it dramatically illustrates the extent to which the speed range for a paddle wheel type speed transducer in accordance with the present invention can be expanded. In reality, at a velocity of 60 m.p.h., beam interruptions will be spaced approximately one millisecond apart.

Figure 3:
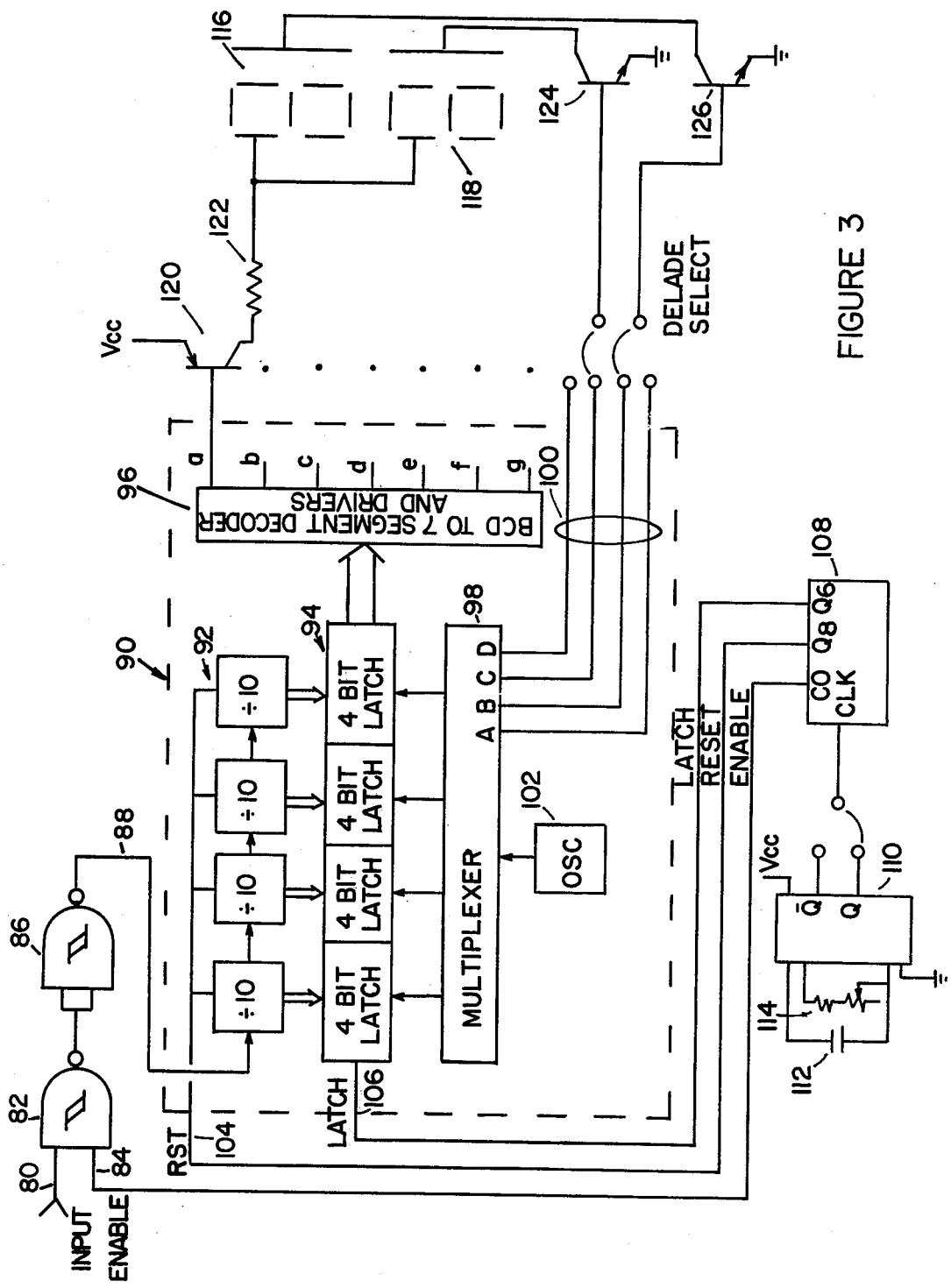
FIG. 3 is a schematic diagram of circuitry for interconnection with the apparatus of FIG. 2 to provide a readout in the form of a digital display of marine vehicle velocity.

Referring next to FIG. 3, the signal output from terminal 68 of the circuit in FIG. 2 is applied via connector 80 to one input of Schmitt trigger 82. The second input 84 is utilized as an enable input to Schmitt trigger 82. The output of Schmitt trigger 82 is applied as the input to Schmitt trigger 86 which has both of its inputs tied together. Both devices 82 and 86 are part of a CMOS CD4093 integrated circuit.

The output 88 of Schmitt trigger 86 is applied as a clock input to a signal processing circuit 90 which includes a counter 92 comprising four decade counters, a latch 94 comprising four 4-bit latches, a multiplexer 98 driven by an internal oscillator 102, and a BCD to 7-segment decoder and driver 96. Device 90 is a MM74C925 available from National Semiconductor. Counter 92 is reset to zero by reset line 104, and a count accumulated in counter 92 is stored in latch 94 by a dock signal on line 106.

The enable signal to device 82, the reset signal to counter 92, and the clock signal to latch 94 are generated by signal processing control logic which includes a clock oscillator 110 and a counter 108 providing a number of decoded outputs. Oscillator 110 is a multivibrator circuit, such as a CD4047 integrated circuit utilizing external timing components to set the frequency of oscillation. The timing components include capacitor 112 and resistor network 114. Counter 108 may be a CD4017 integrated circuit.

To provide a digital readout indication of speed, seven segment display devices 116 and 118 are provided. Each of the seven segments of each display device is driven by a driver circuit comprising a PNP transistor and a series current limiting resistor. The transistor is controlled by a respective output of the output sourcing drivers 96 in device 90. By way of example, transistor 120 and resistor 122 are shown in FIG. 3. The base of transistor 116 is driven by the "a" output of the sourcing drivers 96. The driver circuit comprising transistor 120 and 122 is connected to respective segments of each of the digital display devices 116, 118. It will be appreciated that a similar circuit arrangement is provided for corresponding segments of each of devices 116, 118. Multiplexing of the display devices 116, 118 is provided by connection of the appropriate multiplexing outputs 100 to display device drivers 124, 126. Character-drive-multiplexing is believed to be well-known to those skilled in the art of digital electronic circuitry and will, therefore, not be described in detail.

Processing of the pulse signal developed by the radiant energy paddle wheel transducer shown and described in FIGS. 1 and 2 is made on the basis of the principle that a certain number of pulses will be produced within a prescribed time period when the paddle wheel is being turned at a particular speed, such that with a linear relationship between the number of pulses produced within the prescribed time period and the speed of the marine vehicle, and with a properly chosen time period (based upon the paddle wheel size and speed units to be displayed), the speed of the vehicle can be ascertained if the number of pulses occurring within the prescribed time period is known. Accordingly, by counting the number of pulses that occur within prescribed period, a direct readout of marine vehicle speed can be obtained. This general concept is documented Perron, U.S. Pat. No. 3,746,985, and a comprehensive discussion of the principle is not believed to be necessary.

The foregoing description of the invention has been directed to a particular preferred embodiment for purposes of explanation and illustration. It will be apparent, however, to those skilled in this art that many modifications and changes can be made in the embodiment without departing from the teachings and concept of the invention. It is intended that the following claims cover all equivalent modifications and variations as fall within the scope of the invention.

What is claimed is:

1. A transducer adapted for mounting to a marine vehicle, comprising:
   a housing having first and second sidewalls defining an interior cavity therebetween and having an opening through the bottom;
   means for mounting the housing to a marine vehicle;
   a paddle wheel having a plurality of vanes, said paddle wheel being mounted for rotation within the interior cavity of the housing;
   a source of radiant energy carried on easily detachable means in said housing and mounted on at least one guide means adjacent the paddle wheel on one sidewall of the housing for establishing a beam of radiant energy directed across the interior cavity toward the opposite sidewall so as to be interrupted by each vane of the paddle wheel upon rotation thereof;
   a radiant energy responsive element carried on separate easily detachable means mounted on at least one guide means in said housing and adjacent the paddle wheel on the sidewall of the housing opposite the radiant energy source and disposed in substantial alignment therewith so as to be impinged by the radiant energy beam; and
   means connected to the radiant energy responsive element for producing an electrical signal indicative of the rotational movement of the paddle wheel.

2. The transducer of claim 1 wherein:
   the vanes are affixed to a cylindrical hub portion of the paddle wheel, each vane having a forward surface portion near the end extending tangentially with respect to the hub portion.

3. The transducer of claim 1 wherein:
   the radiant energy source is an infrared light emitting diode; and
   wherein:
   the radiant energy responsive element is a phototransistor.

4. A marine speedometer, comprising:
   (a) a transducer including:
      (i) a housing having first and second sidewalls defining an interior cavity therebetween and having an opening through the bottom;
      (ii) means for mounting the housing to a marine vehicle;
      (iii) a paddle wheel having a plurality of vanes, said paddle wheel being mounted within the interior cavity of the housing for rotation;
      (iv) a source of radiant energy carried on easily detachable means mounted on at least one guide means in said housing and adjacent the paddle wheel on one sidewall of the housing for establishing a beam of radiant energy directed across the interior cavity toward the opposite sidewall so as to be interrupted by each vane of the paddle wheel upon rotation thereof;
      (v) a radiant energy responsive element carried on separate easily detachable means mounted on at least one guide means in said housing and adjacent the paddle wheel on the sidewall of the housing opposite the radiant energy source and disposed in substantial alignment therewith so as to be impinged by the radiant energy beam;
      (vi) means connected to the radiant energy responsive element for producing an electrical pulse signal of a frequency functionally related to the speed of rotation of the paddle wheel; and
   (b) signal processing circuitry including:
      (i) means for gating the electrical pulse signal in response to a gate enable signal;
      (ii) means for counting each pulse of the electrical signal provided by the gating means;
      (iii) a digital display for providing a readout of marine vehicle speed;
      (iv) means for interconnecting the counting means to the digital display; and
      (v) control logic for providing the gate enable signal to the gating means to enable the gating means to supply pulses to the counting means for a prescribed time interval.

5. Transducer apparatus adapted for mounting to a marine vehicle to register movement thereof through water, which comprises:
   a housing;
   a paddle wheel having a plurality of vanes and rotatable about a horizontal axis of rotation in response to force exerted on the vanes by water pressure developed thereagainst by advancement of the paddle wheel through water by a marine vehicle;
   a light source mounted adjacent the paddle wheel and displaced a fixed distance radially from the axis of rotation of the paddle wheel;
   the light source in guide means in said housing and producing a beam of light directed toward the paddle wheel and interrupted by each vane upon rotation of the paddle wheel such that light beam impulses representative of paddle wheel rotation are created directly from the paddle wheel as the paddle wheel is advanced through the water by the marine vehicle; and
   a photodetector device in guide means in said housing and mounted adjacent the paddle wheel on the side thereof opposite the light source and disposed in axial alignment with the light source so as to receive the light beam impulses produced by passage of the paddle wheel vanes through the light beam emanating from the light source; and
   the photodetector device being stimulated by the light beam impulses to produce an electrically detectable response representative of paddle wheel rotation.

6. The apparatus of claim 5 wherein the light source is an infrared light emitting diode.

* * * * *